May 5, 1964     G. P. POPP     3,131,960
STAND-OFF AUTOMOBILE BODY GUARDS
Filed May 17, 1962
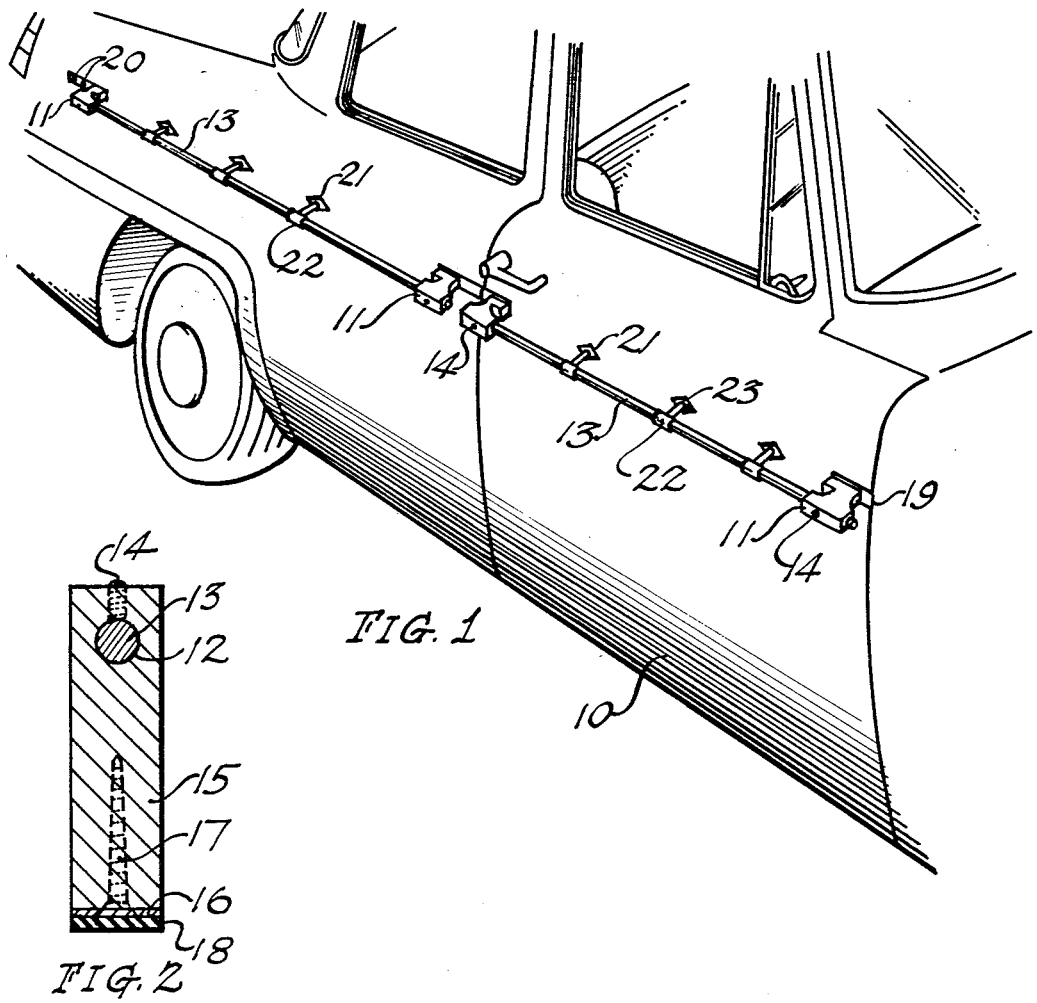
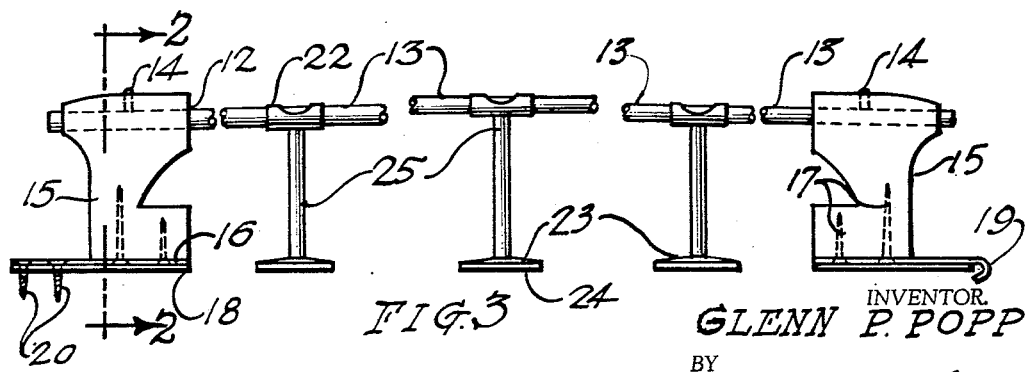
INVENTOR.
GLENN P. POPP
BY
R. Wilson Corder
ATTORNEY

United States Patent Office 3,131,960
Patented May 5, 1964

3,131,960
STAND-OFF AUTOMOBILE BODY GUARDS
Glenn P. Popp, 4243 Lamar St., Decatur, Ga.
Filed May 17, 1962, Ser. No. 195,614
2 Claims. (Cl. 293—1)

This invention relates to safety devices, and more particularly, to a new and improved accessory in the nature of a stand-off automobile body guard designed for the purpose of preventing the door of a car parked adjacent to another, from striking the second vehicle when said door is opened, and damaging the surface and finish of the second automobile.

Heretofore, various bumpers and the like have been devised to protect the front and rear ends of cars, but little if anything has been done to protect the sides and doors thereof although the need for such has been accentuated in recent years with the advent of modern body designing, elimination of running boards, increasing costs in body repair work, and other factors.

An object of the instant invention is to provide a simple and efficient stand-off guard for the doors and sides of automobiles.

Another object is to provide a guard that is easily installed, and replaced or removed as desired.

Another object is to provide a device of the instant type that is sightly and even beautiful in appearance.

A still further object is to provide an economical guard for automobile doors and sides.

Another object is to provide in a device of the instant type a rugged yet non-ponderous structure fully capable of fulfilling its intended purposes.

Another object is to provide a guard that is easily adapted to various sizes, styles and models of automobiles.

Another object is to provide a device that can be replaced part by part in the case of damage and not require an entire new structure.

Another object is to provide a stand-off automobile guard that is economical to manufacture, install and service.

These and other objects made clear during the further progress of this specification, are accomplished by means of the instant invention, a full and complete understanding of which is facilitated by reference to the drawings herein, in which:

FIG. 1 is a view in perspective showing the device associated with the door and rear-side of an automobile;

FIG. 2 is an enlarged view in vertical cross-section taken along the line 2—2 of FIG. 3, looking in the direction of the arrows, and showing in detail one of the supporting brackets or hardware elements of the device.

FIG. 3 is an enlarged top plan view of the accessory structure of FIG. 1, said view being fragmentary in part.

Referring now to the drawings, in which like elements are designated by like numerals throughout, 10 represents a conventional two-door automobile sedan, attached to which is one form of the instant invention, such consisting of a plurality of supporting arms or holders 11, having horizontal apertures 12, through which is passed a guard bar or rod 13, said rod being adjustably held in place by set-screws 14.

Elements 13 may be fabricated from a suitable tough plastic, from metal such as chrome, or other material or materials as the exigencies of a given manufacturing and use situation may dictate.

Holders 11, which may be likewise so formed, and stylized to meet exotic requirements, may be of generally Z shape, with their top portions carrying the rod supporting channels or apertures 12, and their bases 15 having secured thereto metallic securing elements 16 as by screws 17, and insulating pads or cushions 18. In the case of an element 11 contemplated to be installed by hooking over the edge of the door of a car, element 16 is provided with a suitable hook 19 (FIG. 3); and where no such anchorage is available as when the device is fastened to the side of a vehicle (see left end of FIG. 1), one or more screws 20 (FIG. 3) may be used to secure the supporting arm to the vehicle, the hook being omitted in such case.

For the purpose of spacing, reinforcing, and generating a degree of tension in rods 13, a plurality of stand-off members 21 are provided, these elements being provided with sleeves 22 through which the rods are passed in close frictional engagement therewith, and the bases 23 of which are preferably provided with suitable pads 24 secured thereto in any appropriate manner. When elements 21 are employed in series of three as shown in the drawings herein, it is desirable that the stem portions 25 thereof be approximately one-eighth inch longer in the case of elements one and three of each series than is the corresponding dimension of their associated end members 11; and that the middle or second stand-off element be approximately one-fourth inch longer than said end members; thereby generating a degree of tension and rigidity in the entire structure once it is assembled in place on an automobile.

In this connection it is easy to now visualize such assembly, it only being necessary to hook appendages 19 over the edges of a car door, set-screws 14 having been loosened first, and then adjust rod 13 with reference to end holders 11 so that it is in straight horizontal or semi-horizontal position, after which the set-screws are tightened and elements 21 pivoted into position to generate the desired tension in the rod; or the same result can largely be achieved by having members 21 in position at the time the screws are tightened.

When no hooking action is possible at one end of the guard, as in the case of the structure illustrated at the left of FIG. 1, simple screws 20 may be employed to anchor the guard to the car, the other end being hooked as described above and set-screw adjustment being the same. In situations where double screw anchorage is required or indicated, this may be easily accomplished by providing two end holders of the screw-fastened variety, hooks being entirely eliminated in such case.

From the foregoing it is apparent that there has been shown and described herein a new and unique stand-off side and body guard for modern automobiles. That such device is simple in structure and operation, economical of manufacture, and thoroughly adapted to and for its intended purposes.

While there has been disclosed in considerable detail, one form of the instant invention, it is understood that no limitations are intended or implied thereby, but on the contrary that certain modifications, changes, alterations, additions and subtractions may be resorted to without departing from the scope and construction of the appended claims, which are to be given an interpretation fairly in keeping with the contribution to the art.

I claim:

1. In a device of the character described, a plurality of holding elements, a horizontal rod fixedly mounted therein, means for securing the holding elements to the side of an automobile, and stand-off means adapted to be positioned between the rod and the vehicle, said stand-off means being of a horizontal dimension slightly greater than that of the holding element, whereby the rod is maintained under tension.

2. In a device of the character described, a plurality of supporting arms, a longitudinally extending guard member fixedly secured therein, means for mounting said supporting arms upon the side of an automobile, and stand-off means adapted to be positioned between the rod and the vehicle in pivotal relationship to the rod, said stand-off means having a horizontal dimension progressively slightly greater than that of the supporting arms and then diminishing from a central point of maximum dimension to initial dimension, whereby the rod is maintained under slightly bowed longitudinal tension at all times during which it is operative on the vehicle.

References Cited in the file of this patent

UNITED STATES PATENTS

| | | |
|---|---|---|
| 1,465,589 | Rodgers | Aug. 21, 1923 |
| 2,172,830 | Carlson | Sept. 12, 1939 |
| 2,456,157 | Tadd | Dec. 14, 1948 |
| 2,675,983 | King | Apr. 20, 1954 |
| 2,889,165 | Zientara | June 2, 1959 |

FOREIGN PATENTS

| | | |
|---|---|---|
| 511,441 | Germany | Oct. 30, 1930 |